(12) United States Patent
Cho et al.

(10) Patent No.: US 9,612,646 B2
(45) Date of Patent: *Apr. 4, 2017

(54) TIME-DIVISION DRIVING TYPE TOUCH SENSING DEVICE AND METHOD FOR DRIVING THE SAME

(71) Applicant: LG Display Co., Ltd., Seoul (KR)

(72) Inventors: Namkyun Cho, Gumi-si (KR); Keuksang Kwon, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,352

(22) Filed: Jan. 29, 2016

(65) Prior Publication Data

US 2016/0147283 A1 May 26, 2016

Related U.S. Application Data

(63) Continuation of application No. 14/711,561, filed on May 13, 2015, now Pat. No. 9,285,912.

(30) Foreign Application Priority Data

May 30, 2014 (KR) .................. 10-2014-0065874

(51) Int. Cl.
*G06F 3/041* (2006.01)
*G06F 1/32* (2006.01)
(Continued)

(52) U.S. Cl.
CPC .......... *G06F 1/3262* (2013.01); *G06F 1/3287* (2013.01); *G06F 3/044* (2013.01);
(Continued)

(58) Field of Classification Search
CPC .... G06F 1/3262; G06F 1/3287; G06F 3/0412; G06F 3/0416; G06F 3/0488; G09F 3/044; G09F 3/3696
(Continued)

(56) References Cited

U.S. PATENT DOCUMENTS 5,553,296 A * 9/1996 Forrest .................. G06F 1/3209
713/321
5,854,448 A 12/1998 Nozaki et al.
(Continued)

FOREIGN PATENT DOCUMENTS

KR 10-2007-0002327 A 1/2007
KR 10-2011-0068148 A 6/2011
(Continued)

OTHER PUBLICATIONS

Korean Office Action, Korean Application No. 10-2014-0065874, Jul. 31, 2015, 4 pages (with concise explanation of relevance).
(Continued)

*Primary Examiner* — Rodney Amadiz
(74) *Attorney, Agent, or Firm* — Fenwick & West LLP

(57) ABSTRACT

A touch sensing display device supporting a pixel driving period and a touch driving period in each frame period. The device comprises a display panel having data lines and touch sensing lines, the data lines coupled to pixels of the display panel. A data driving circuit drives data signals onto the data lines during the pixel driving period of the frame period. A touch readout circuit generates touch data of signals of the touch sensing lines during the touch driving period of the frame period, the touch driving period distinct of the pixel driving period. A supply voltage of the data driving circuit can be cut off during the touch driving period, and a supply voltage of the touch readout circuit can be cut off during the pixel driving period.

17 Claims, 11 Drawing Sheets

(51) Int. Cl.
*G06F 3/044* (2006.01)
*G09G 3/36* (2006.01)
*G09G 3/20* (2006.01)

(52) U.S. Cl.
CPC .......... *G06F 3/0412* (2013.01); *G06F 3/0416* (2013.01); *G09G 3/2092* (2013.01); *G09G 3/3696* (2013.01); *G09G 2310/065* (2013.01)

(58) Field of Classification Search
USPC ............ 345/156, 173–178; 178/18.01–18.11
See application file for complete search history.

(56) References Cited

U.S. PATENT DOCUMENTS

| | | | |
|---|---|---|---|
| 7,859,521 | B2 | 12/2010 | Hotelling et al. |
| 7,995,041 | B2 | 8/2011 | Chang |
| 8,217,913 | B2 | 7/2012 | Hotelling et al. |
| 8,363,027 | B2 | 1/2013 | Hotelling et al. |
| 8,502,799 | B2 | 8/2013 | Hotelling et al. |
| 8,831,691 | B2 | 9/2014 | Choi et al. |
| 9,024,913 | B1 | 5/2015 | Jung et al. |
| 9,134,560 | B2 | 9/2015 | Hotelling et al. |
| 9,285,912 | B2 * | 3/2016 | Cho ...................... G06F 3/0412 |
| 2010/0253638 | A1 | 10/2010 | Yousefpor et al. |
| 2010/0295833 | A1 * | 11/2010 | Nishio .................. G06F 3/0412 345/207 |
| 2011/0057914 | A1 * | 3/2011 | Nam .................... G09G 3/3648 345/211 |
| 2011/0090193 | A1 * | 4/2011 | Imai ........................ G01J 1/46 345/207 |
| 2011/0134051 | A1 | 6/2011 | Lin |
| 2011/0181568 | A1 * | 7/2011 | Sugiyama ............. G02F 1/1354 345/207 |
| 2012/0001862 | A1 | 1/2012 | Durbin |
| 2013/0321295 | A1 | 12/2013 | Lin et al. |
| 2013/0342478 | A1 | 12/2013 | Bae et al. |

FOREIGN PATENT DOCUMENTS

| | | |
|---|---|---|
| KR | 10-2012-0017755 A | 2/2012 |
| KR | 10-2012-0067250 A | 6/2012 |
| KR | 10-2012-0097762 A | 9/2012 |
| KR | 10-2013-0015582 A | 2/2013 |

OTHER PUBLICATIONS

United States Office Action, U.S. Appl. No. 14/711,561, Jul. 17, 2015, 11 pages.

* cited by examiner

TIME-DIVISION DRIVING TYPE TOUCH SENSING DEVICE AND METHOD FOR DRIVING THE SAME

This application is a continuation application under 35 U.S.C. §120 of U.S. patent application Ser. No. 14/711,561 filed on May 13, 2015, which claims the benefit of Korea Patent Application No. 10-2014-0065874 filed on May 30, 2014, all of which are incorporated herein by reference for all purposes as if fully set forth herein.

BACKGROUND OF THE INVENTION

Field of the Invention

Embodiments of the invention relate to a time-division driving type touch sensing device and a method for driving the same.

Discussion of the Related Art

User interfaces (UI) are configured so that users are able to communicate with various electronic devices and thus can easily and comfortably control the electronic devices as they desire. Examples of a user interface include a keypad, a keyboard, a mouse, an on-screen display (OSD), and a remote controller having an infrared communication function or a radio frequency (RF) communication function. User interface technology has continuously expanded to increase usability and handling convenience. The user interfaces have been recently developed to include touch UI, voice recognition UI, 3D UI, etc.

The touch UI has been used in mobile devices. The touch UI is implemented by forming a touch screen on the screen of a display element. The touch screen may be implemented as a capacitive touch screen. The touch screen has capacitive touch sensors sensing changes (i.e., changes in charges of the touch sensor) in a capacitance generated when the user touches the touch sensor with his or her finger or a conductive material, and thus detects a touch input.

A touch sensing device having a touch screen integrated type display element senses changes in capacitance of touch sensors before and after a touch (or proximity) operation and decides whether or not there is a touch (or proximity) input using a conductive material. Further, the touch sensing device finds out a position of the touch input when there is the touch input. In the touch sensing device, one frame period may be time-divided into a pixel driving period P1, in which data of an input image is applied to pixels of the display element, and a touch sensor driving period P2, in which the touch sensors are driven, as shown in FIG. 1.

The time-division driving type touch sensing device has a problem of an increase in power consumption due to power consumed by circuit blocks, that are not used in the driving periods P1 and P2.

The time-division driving type touch sensing device may include a source driver integrated circuit (IC), that normally operates only during the pixel driving period P1, and a readout IC, that normally operates only during the touch sensor driving period P2. The source driver IC does not need to operate during the touch sensor driving period P2 and thus is not used during the touch sensor driving period P2. On the other hand, the readout IC does not need to operate during the pixel driving period P1 and thus is not used during the pixel driving period P1.

However, during operation of the time-division driving type touch sensing device, driving power is continuously supplied to each of the source driver IC and the readout IC. Thus, unnecessary current flows into the unused readout IC during the pixel driving period P1, and also unnecessary current flows into the unused source driver IC during the touch sensor driving period P2. Hence, the power consumption of the time-division driving type touch sensing device increases.

SUMMARY OF THE INVENTION

Accordingly, embodiments of the invention provide a time-division driving type touch sensing device and a method for driving the same capable of reducing power consumption.

In one embodiment, a touch sensing display device supporting a pixel driving period and a touch driving period in each frame period is disclosed. The device comprises a display panel having data lines and touch sensing lines, the data lines coupled to pixels of the display panel; a data driving circuit to drive data signals onto the data lines during the pixel driving period of the frame period, the data driving circuit powered by a first supply voltage; a touch readout circuit to generate touch data of signals of the touch sensing lines during the touch driving period of the frame period, the touch driving period distinct from the pixel driving period; and a first power controller to cut off the first supply voltage of the data driving circuit during the touch driving period of the frame period.

The touch readout circuit can be powered by a second supply voltage. The display also comprises a second power controller to cut off the second supply voltage of the touch readout circuit during the pixel driving period of the frame period.

The display device can comprise a timing controller to generate a shut down control signal. The first power controller cuts off the first supply voltage of the data driving circuit responsive to the shut down control signal. The timing controller can also generate a wake up signal, and the first power controller applies the first supply voltage to the data driving circuit responsive to the wake up signal.

The first supply voltage that is cut off during the touch driving period of the frame period can be a supply voltage for an analog portion of the data driving circuit. Alternatively, the first supply voltage that is cut off during the touch driving period of the frame period can be a supply voltage for a digital portion of the data driving circuit.

The data driving circuit can comprise a digital-to-analog converter (DAC) to convert video data into analog data voltages; and an output circuit to drive the analog data voltages onto the data lines. The first supply voltage that is cut off during the touch driving period of the frame period is a supply voltage for the output circuit but not the DAC.

The touch sensing display device can comprise a common electrode patterns corresponding to the pixels, the common electrode patterns driven with at least one touch driving signal during the touch driving period and driven with a common voltage during the pixel driving period.

In another embodiment, a touch sensing display device supporting a pixel driving period and a touch driving period in each frame period is disclosed. The device comprises a display panel having data lines and touch sensing lines, the data lines coupled to pixels of the display panel; a data driving circuit to drive data voltages onto the data lines during the pixel driving period of the frame period; a touch readout circuit to generate touch data of signals of the touch sensing lines during the touch driving period of the frame period, the touch driving period distinct from the pixel driving period, the touch readout circuit powered by a first supply voltage; and a first power controller to cut off the first supply voltage of the touch readout circuit during the pixel driving period of the frame period.

The data driving circuit can be powered by a second supply voltage, and the display device further comprises a second power controller to cut off the second supply voltage of the data driving circuit during the touch driving period of the frame period.

The display device can comprise a timing controller to generate a timing division synchronization signal indicative of whether the frame period is in the pixel driving period or the touch driving period. The first power controller cuts off the first supply voltage of the touch readout circuit responsive to the timing division synchronization signal.

The first supply voltage that is cut off during the pixel driving period of the frame period can be a supply voltage for an analog portion of the touch readout circuit. Alternatively, the first supply voltage that is cut off during the pixel driving period of the frame period is a supply voltage for a digital portion of the touch readout circuit.

The display device can comprise common electrode patterns corresponding to the pixels, the common electrode patterns driven with at least one touch driving signal during the touch driving period and driven with a common voltage during the pixel driving period.

In a further embodiment, a method of operation in a touch sensing display device is disclosed. The method can comprise driving, by a data driving circuit powered by a first supply voltage, data voltages onto data lines of a display panel during a pixel driving period of a frame period, the data lines coupled to pixels of the display panel; generating touch data from signals of touch sensing lines of the display panel during a touch driving period of the frame period, the touch driving period distinct from the pixel driving period; and cutting off the first supply voltage of the data driving circuit during the touch driving period of the frame period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

A touch sensing device according to an exemplary embodiment of the invention includes a touch screen integrated type display element. The display element may be implemented based on a flat panel display, such as a liquid crystal display (LCD), an organic light emitting diode (OLED) display, an electrophoresis display (EPD), and a plasma display panel (PDP). In the following description, the embodiment of the invention will be described using the liquid crystal display as an example of the flat panel display. Other flat panel displays may be used.

Figure 1:
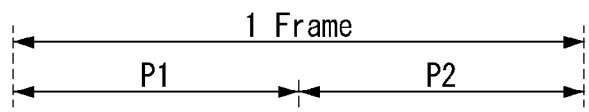
FIG. 1 shows an example where one frame period is time-divided into a pixel driving period and a touch sensor driving period.
Figure 2:
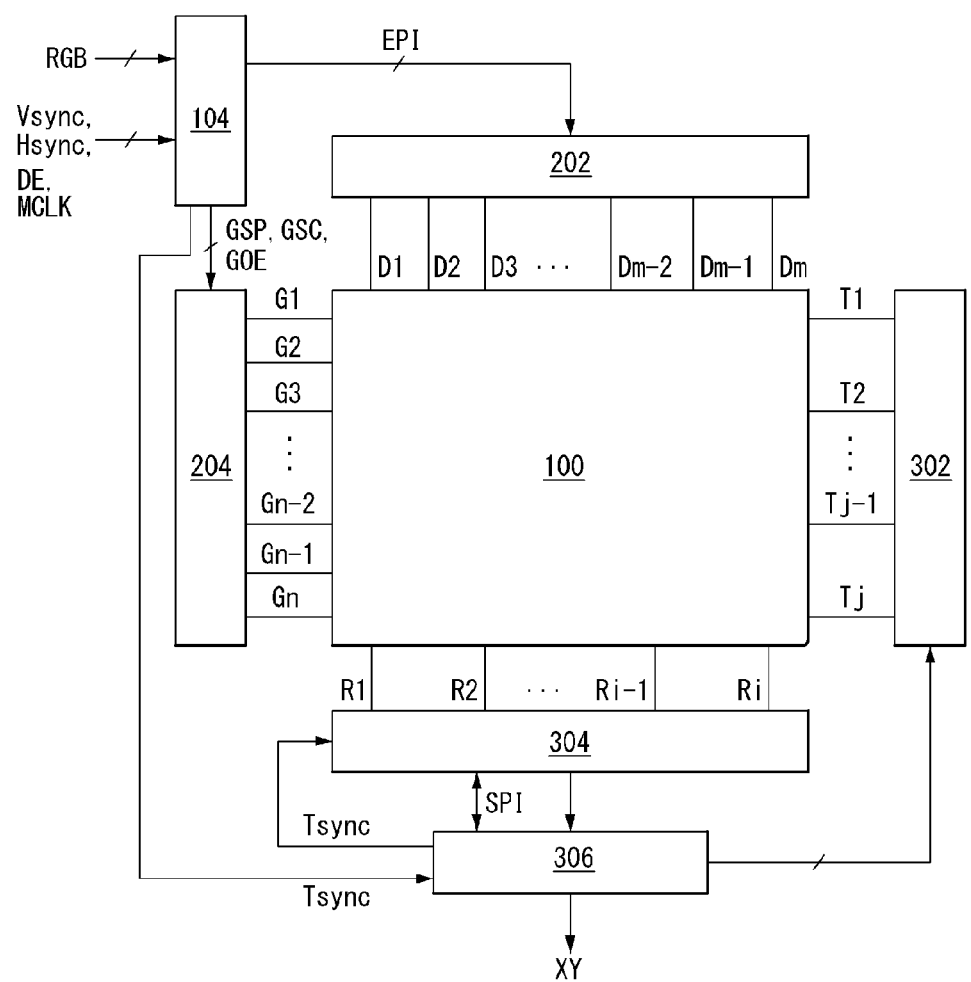
FIG. 2 is a block diagram of a time-division driving type touch sensing device according to an exemplary embodiment of the invention.
Figure 3:
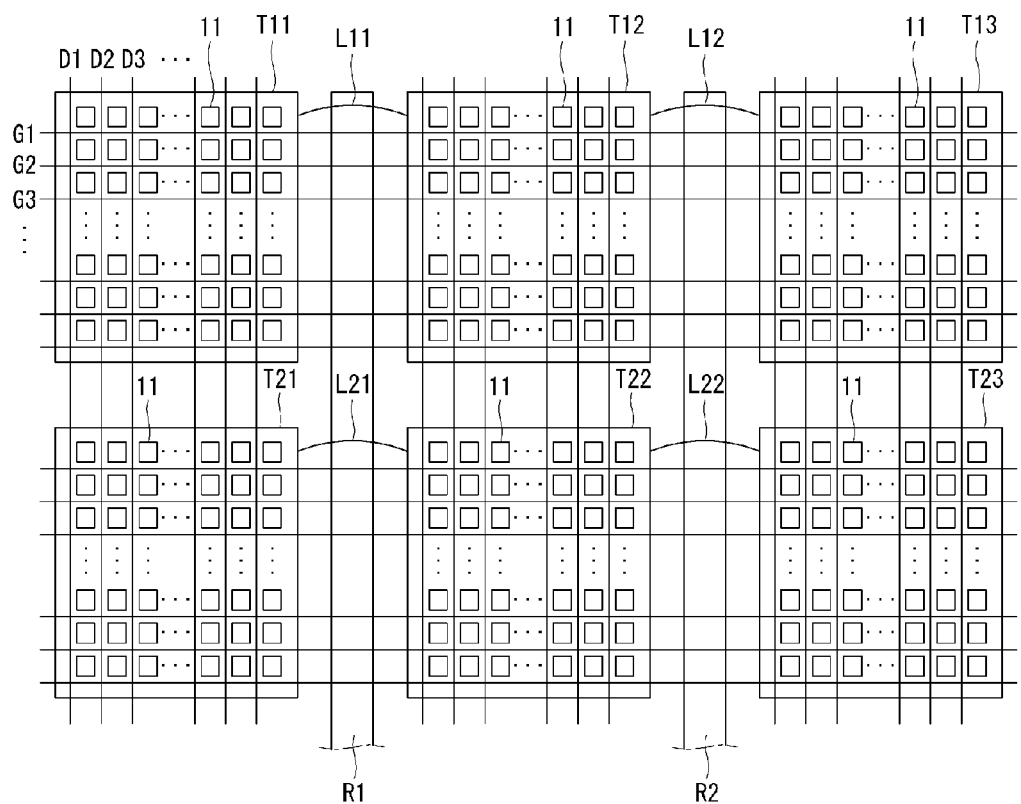
FIG. 3 shows an example of touch sensors embedded in a pixel array.
Figure 4:
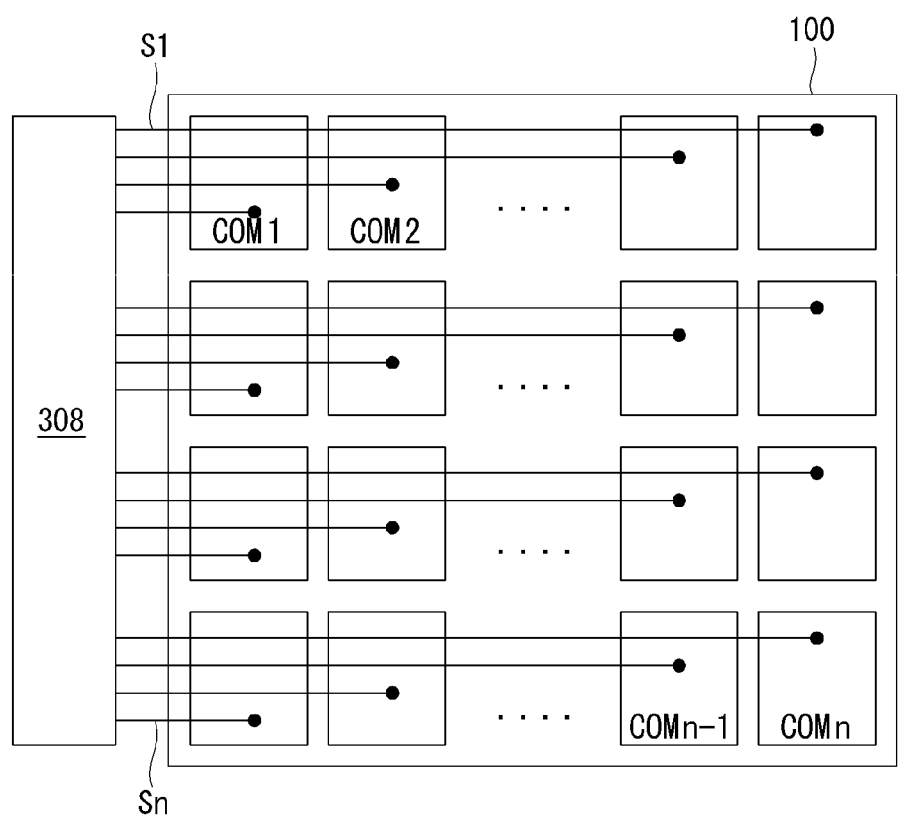
FIG. 4 shows another example of touch sensors embedded in a pixel array.

A touch screen according to the embodiment of the invention includes touch sensors, and the touch sensors may be embedded in a pixel array. The touch sensors may be implemented as capacitive touch sensors which sense a touch input based on changes in a capacitance before and after a touch operation. The capacitive touch sensors may be classified into mutual capacitive touch sensors and self capacitive touch sensors. As shown in FIG. 3, the mutual capacitive touch sensor is formed between two conductor lines perpendicular to each other. As shown in FIG. 4, the self capacitive touch sensor is formed along conductor lines of a single layer formed in one direction.

Referring to FIGS. 2 to 7, a touch sensor embedded type touch sensing device according to the embodiment of the invention includes a display panel 100, display driving circuits 202, 204, and 104, touch sensor driving circuits 302, 304, 306, and 308, and the like.

A thin film transistor (TFT) array substrate of the display panel 100 includes a plurality of data lines D1 to Dm (where m is a positive integer), a plurality of gate lines G1 to Gn (where n is a positive integer) crossing the data lines D1 to Dm, a plurality of pixel TFTs formed at crossings of the data lines D1 to Dm and the gate lines G1 to Gn and that are coupled to these lines, a plurality of pixel electrodes 11 which are connected to the data lines D1 to Dm through the pixel TFTs and are charged to a data voltage, a plurality of common electrodes to which a common voltage Vcom is supplied, a plurality of touch sensors, and the like. The TFT array substrate further includes storage capacitors (not shown). The storage capacitor is connected to the pixel electrode 11 and holds a voltage of a liquid crystal cell.

Figure 7:
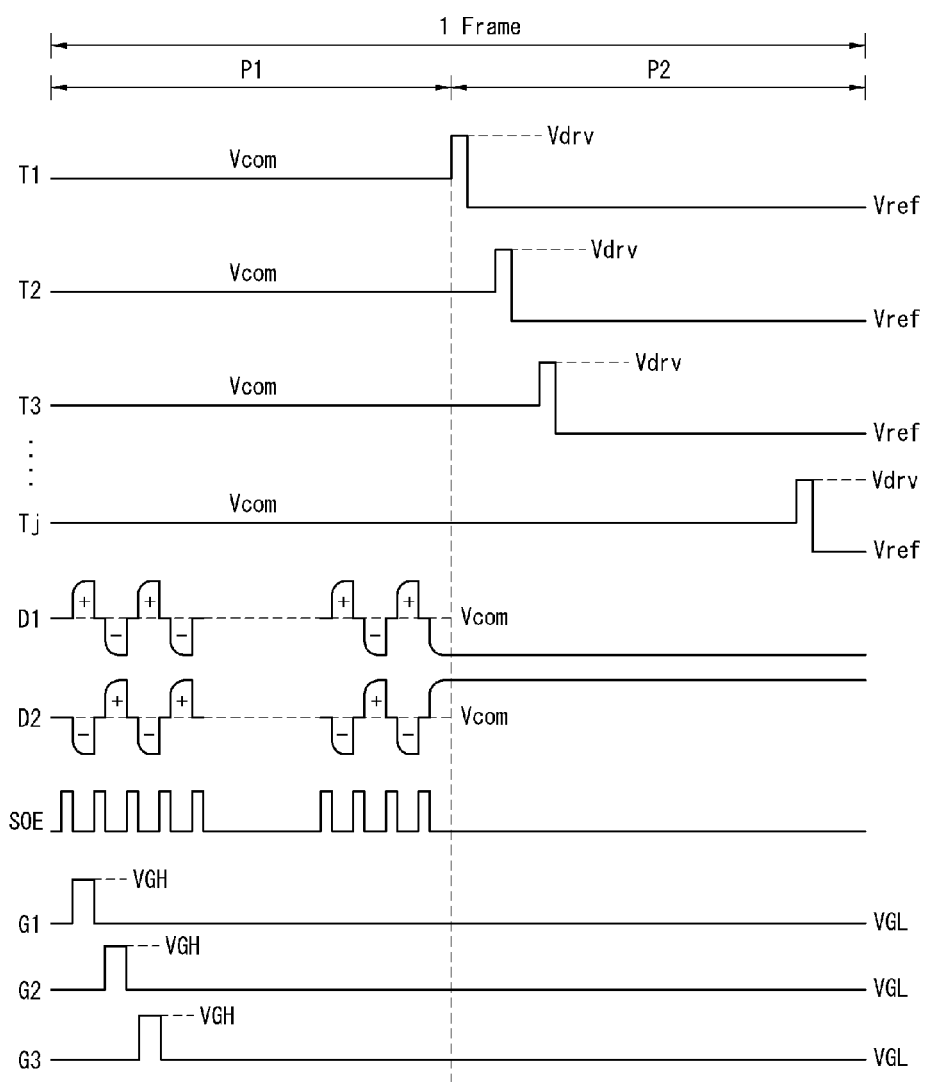
FIG. 7 is a waveform diagram showing an example of a time-division driving method of a pixel driving period and a touch sensor driving period.

As shown in FIG. 7, in the touch sensing device according to the embodiment of the invention, one frame period may be time-divided into a pixel driving period P1, in which data of an input image is applied to pixels of the display element by driving data voltages onto the data lines D1-Dn, and a touch sensor driving period P2, in which the touch sensors are driven and touch signals are converted into touch data. Pixel driving period P1 is distinct in time from touch sensor driving period P2. In this instance, video data corresponding to one frame is applied to all of the pixels during the pixel driving period P1, and all of touch driving lines are driven during the touch sensor driving period P2.

Figure 5:
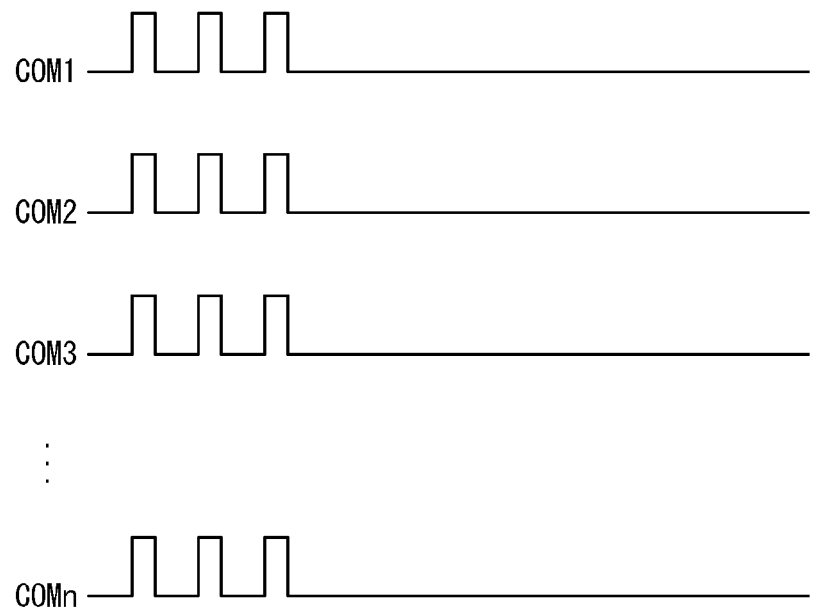
FIG. 5 is a waveform diagram to operate a touch sensor shown in FIG. 4.
Figure 6:
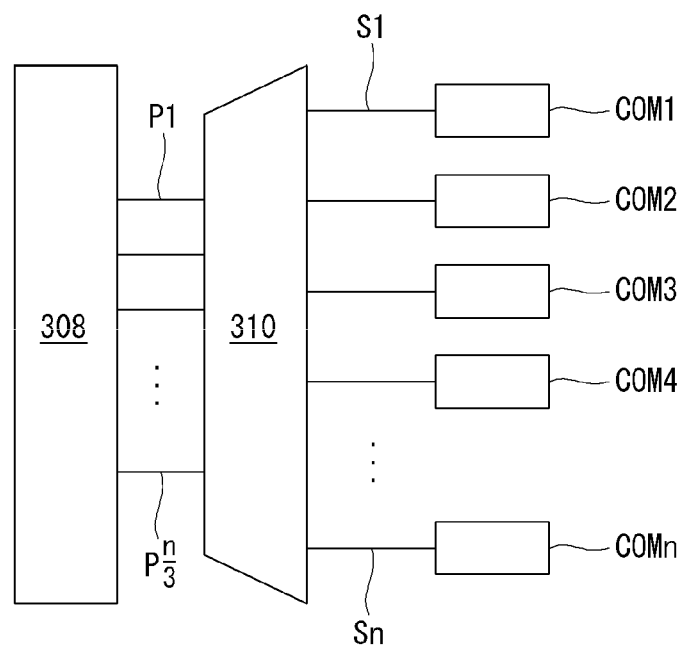
FIG. 6 shows a multiplexer formed between a touch sensor driving circuit and touch sensors.

The touch sensors according to the embodiment of the invention may be implemented as mutual capacitive touch sensors as shown in FIG. 3, or may be implemented as self capacitive touch sensors as shown in FIGS. 4 to 6.

The mutual capacitive touch sensors include touch driving Tx lines T1 to Tj (where 'j' is a positive integer less than n), touch sensing Rx lines R1 to Ri (where 'i' is a positive integer less than m), mutual capacitances formed at crossings of the Tx lines T1 to Tj and the Rx lines R1 to Ri, and the like. The mutual capacitive touch sensors having an electrode structure shown in FIG. 3 may be embedded in the pixel array. The Tx lines T1 to Tj include common electrode division patterns T11 to T23 and link patterns L11 to L22. The first Tx line T1 includes the plurality of common electrode division patterns T11 to T13 which are connected along a horizontal direction via the link patterns L11 and L12. The second Tx line T2 includes the plurality of common electrode division patterns T21 to T23 which are connected along the horizontal direction via the link patterns L21 and L22. The size of each of the common electrode division patterns T11 to T23 may be patterned to be larger than the pixel size, so that each common electrode division pattern includes two or more pixel areas. Each of the common electrode division patterns T11 to T23 may be formed of a transparent conductive material such as indium tin oxide (ITO). The link patterns L11 to L22 electrically connect the common electrode division patterns T11 to T23 which are adjacent to each other in the horizontal direction. The mutual capacitive touch sensors may have structures other than the structure shown in FIG. 3. For example, the mutual capacitive touch sensors embedded in the pixel array may be manufactured using the structure disclosed in Korean Patent Application No. 10-2012-0143228 (Dec. 11, 2012) owned by the present applicant, and which are hereby incorporated by reference in their entirety.

The Tx lines T1 to Tj and the Rx lines R1 to Ri are connected to the common electrodes and supply the common voltage Vcom to the common electrodes during the pixel driving period P1. During the touch sensor driving period P2, a touch driving signal for driving the touch sensors is supplied to the Tx lines T1 to Tj, and the Rx lines R1 to Ri receive a touch sensing signal output of the touch sensors in synchronization with the driving signal.

The circuitry within the touch sensor circuit 304 may also be divided into different power domains (not shown). A primary power domain includes circuitry to provide the common voltage Vcom to the Rx lines during the pixel driving period P1. A secondary power domain includes circuitry to receive and convert the touch sensing signals to touch data during the touch sensor driving period P2. The secondary power domain is powered by a supply voltage VDD or VCC, and the supply voltage VDD or VCC can be selectively cut off to reduce power consumption in the touch sensor circuit 304.

Referring to FIGS. 4 to 6, the self capacitive touch sensors may include common electrode division patterns COM1 to COMn. Each of the common electrode division patterns COM1 to COMn may be formed of indium tin oxide (ITO) and may be patterned to be larger than the pixel. As shown in FIG. 4, the touch sensor driving circuit 308 may be individually connected to the common electrode division patterns COM1 to COMn through sensing lines S1 to Sn. The touch sensor driving circuit 308 may supply the common voltage Vcom to the common electrode division patterns COM1 to COMn during the pixel driving period P1. The touch sensor driving circuit 308 may supply a touch driving signal shown in FIG. 5 to the touch sensing lines S1 to Sn during the touch sensor driving period P2 and may sense changes in capacitances of the touch sensors. As shown in FIG. 6, a multiplexer 310 may be installed between the driving circuit 308 and the touch sensing lines S1 to Sn, so as to reduce the number of pins of the driving circuit 308.

The circuitry within the touch sensor driving circuit 308 may also be divided into different power domains (not shown). A primary power domain includes circuitry to provide the common voltage Vcom to the sensing lines S1 to Sn lines during the pixel driving period P1. A secondary power domain includes circuitry to supply touch driving signals to the sensing lines S1 to Sn and to generate touch data during the touch sensor driving period P2. The secondary power domain is powered by a supply voltage VDD or VCC, and the supply voltage VDD or VCC can be selectively cut off to reduce power consumption in the touch sensor driving circuit 308.

The pixel array of the display panel 100 displays an input image. The pixels of the pixel array are formed in pixel areas defined by the data lines D1 to Dm and the gate lines G1 to Gn in a matrix form. Each pixel is driven by an electric field applied depending on a voltage difference between the data voltage applied to the pixel electrode 11 and the common voltage Vcom applied to the common electrode, thereby adjusting a transmission amount of incident light. The TFTs are turned on in response to a gate pulse from the gate lines G1 to Gn and thus supply a data voltage from the data lines D1 to Dm to the pixel electrodes 11 of the liquid crystal cells. The common electrodes receive the common voltage Vcom during the pixel driving period P1 and form a reference potential of the pixels. The common electrode may be divided as shown in FIGS. 3 and 4 and may be used as an electrode of the touch sensor during the touch sensor driving period P2.

Black matrixes, color filters, etc. may be formed on a color filter substrate of the display panel 100. Polarizing plates are respectively attached to the TFT array substrate and the color filter substrate of the display panel 100. Alignment layers for setting a pre-tilt angle of liquid crystals are respectively formed on the inner surfaces contacting the liquid crystals in the TFT array substrate and the color filter substrate of the display panel 100. A column spacer is formed on a liquid crystal layer of the display panel 100 to keep cell gaps of the liquid crystal cells constant.

The display driving circuits 202, 204, and 104 apply data to the pixels. The display driving circuits 202, 204, and 104 include a data driving circuit 202, a gate driving circuit 204, and a timing controller 104.

The data driving circuit 202 includes a plurality of source driver integrated circuits (ICs) SDIC. The source driver ICs SDIC are connected to the timing controller 104 through EPI (clock embedded) line pairs. The source driver ICs SDIC output an analog video data voltage during the pixel driving period P1.

A new signal transmission protocol (hereinafter referred to as "EPI interface protocol"), which connects the timing controller 104 to the source driver ICs SDIC in a manner to minimize the number of lines between the timing controller 104 and the source driver ICs SDIC and to stabilize the signal transmission, was disclosed in Korean Patent Application No. 10-2008-0127458 (Dec. 15, 2008), U.S. patent application Ser. No. 12/543,996 (Aug. 19, 2009), Korean Patent Application No. 10-2008-0127456 (Dec. 15, 2008), U.S. patent application Ser. No. 12/461,652 (Aug. 19, 2009), Korean Patent Application No. 10-2008-0132466 (Dec. 23, 2008), and U.S. patent application Ser. No. 12/537,341 (Aug. 7, 2009) owned by the present applicant, and which are hereby incorporated by reference in their entirety.

The EPI interface protocol has the following characteristics (1) to (3).

(1) A transmitting terminal of the timing controller 104 is connected to receiving terminals of the source driver ICs SDIC via signal line pairs (hereinafter referred to as "EPI line pairs").

(2) Separate clock line pairs are not connected between the timing controller 104 and the source driver ICs SDIC. The timing controller 104 transmits a clock signal and digital data to the source driver ICs SDIC through the EPI line pairs. The digital data includes video data of the input image and source control data for controlling operations of the source driver ICs SDIC.

(3) A clock recovery circuit for clock and data recovery (CDR) is embedded in each of the source driver ICs SDIC. The timing controller 104 transmits a clock training pattern signal, namely, a preamble signal to the source driver ICs SDIC, so that an output phase and an output frequency of the clock recovery circuit can be locked. The clock recovery circuit embedded in each source driver IC SDIC generates an internal clock in response to the preamble signal input through the EPI line pairs and locks a phase and a frequency of the internal clock.

When the phase and the frequency of the internal clock are locked, the source driver ICs SDIC feedback-input a lock signal LOCK of a high logic level indicating an output stabilization state to the timing controller 104. When the phase and the frequency of the internal clock are stably locked, a data link, to which the video data of the input image is transmitted, is formed between the source driver ICs SDIC and the timing controller 104. After the lock signal LOCK is received from the last source driver IC SDIC, the timing controller 104 starts to transmit the video data and the control data to the source driver ICs SDIC. When the output phase and the output frequency of the clock recovery circuit embedded in any one of the source driver ICs SDIC are unlocked, the lock signal LOCK is inverted to a low logic level. The last source driver IC SDIC transmits the lock signal LOCK of the low logic level to the timing controller 104. When the lock signal LOCK is inverted to the low logic level, the timing controller 104 transmits the preamble signal to the source driver ICs SDIC and resumes the clock training of the source driver ICs SDIC.

The source driver ICs SDIC sample and latch digital video data RGB received from the timing controller 104 through the EPI line pairs during the pixel driving period P1. The source driver ICs SDIC convert the digital video data RGB into positive and negative analog gamma compensation voltages and output the positive and negative data voltages during the pixel driving period P1. The positive and negative data voltages (+/−) (refer to FIG. 7) are supplied to the data lines D1 to Dm. The source driver ICs SDIC output the data voltage during a low logic period of a source output enable signal SOE. On the other hand, the source driver ICs SDIC do not output the data voltage and may perform the charge sharing during a high logic period of the source output enable signal SOE.

The source driver ICs SDIC may perform the clock training in response to the preamble signal received from the timing controller 104 during the touch sensor driving period P2.

The gate driving circuit 204 generates a gate pulse (or a scan pulse) synchronized with the data voltage, shifts the gate pulse, and sequentially supplies the gate pulse to the gate lines G1 to Gn under the control of the timing controller 104 during the pixel driving period P1. The gate driving circuit 204 is known as a scan driving circuit. The gate driving circuit 204 includes at least one gate driver IC. The gate driver IC sequentially supplies the gate pulse synchronized with the data voltage to the gate lines G1 to Gn under the control of the timing controller 104 and selects lines of the display panel 100, to which data of the input image is applied, during the pixel driving period P1. The gate pulse swings between a gate high voltage VGH and a gate low voltage VGL as shown in FIG. 7.

The gate driving circuit 204 does not generate the gate pulse and may supply the gate low voltage VGL to the gate lines G1 to Gn during the touch sensor driving period P2. Thus, the gate lines G1 to Gn supply the gate pulse to the TFTs of the pixels and sequentially select lines of the display panel 100, to which the data of the input image is applied, during the pixel driving period P1. Further, the gate lines G1 to Gn are held at the gate low voltage VGL and prevents changes in the output of the touch sensors during the touch sensor driving period P2.

The timing controller 104 may encode source control data for controlling operation timing of the data driving circuit 202 using timing signals, such as a vertical sync signal Vsync, a horizontal sync signal Hsync, a data enable signal DE, and a main clock MCLK, received from an external host system. The timing controller 104 may transmit the source control data to the source driver ICs SDIC through the EPI line pairs. Further, the timing controller 104 may transmit a timing control signal for controlling operation timing of the gate driving circuit 204 to the gate driving circuit 204 using the timing signals received from the host system. The timing control signal of the gate driving circuit 204 includes a gate start pulse GSP, a gate shift clock GSC, a gate output enable signal GOE, and the like. The source control data includes a polarity control signal POL, a source output enable signal SOE, option information for controlling output channels of the source driver ICs SDIC, and the like.

The timing controller 104 may compress an external data enable signal received from the host system within the previously set pixel driving period P1 and generate an internal data enable signal iDE. The timing controller 104 may generate a time-division sync signal Tsync for time-dividing one frame period into the pixel driving period P1 and the touch sensor driving period P2 in conformity with the timing of the vertical sync signal Vsync and the internal data enable signal iDE. The timing controller 104 may transmit the time-division sync signal Tsync to a touch controller 306 and may synchronize operations of the display driving circuits 202, 204, and 104 with operations of the touch sensor driving circuits 302, 304, 306, and 308.

If the internal data enable signal iDE starts to be generated, the timing controller 104 may transmit the preamble signal, the control data, and the data of the input image to the source driver ICs SDIC. The timing controller 104 may sequentially transmit the preamble signal, the control data, and the digital video data RGB of the input image to the source driver ICs SDIC based on the EPI interface protocol during the pixel driving period P1. The timing controller 104 may not transmit an EPI interface signal to the source driver ICs SDIC during the touch sensor driving period P2.

The host system converts the digital video data RGB of the input image into a data format suitable to be displayed on the display panel 100. The host system transmits the digital video data RGB of the input image and the timing signals Vsync, Hsync, DE, and MCLK to the timing controller 104. The host system may be implemented as one of a television system, a set-top box, a navigation system, a DVD player, a Blu-ray player, a personal computer (PC), a home theater system, and a phone system and receives the input image. The host system runs an application associated with touch input coordinates received from the touch controller 306.

The touch sensor driving circuits 302, 304, 306, and 308 drive the touch sensors and sense the touch input of the touch sensors during the touch sensor driving period P2. The touch sensor driving circuits 302, 304, 306, and 308 include the driving circuit 302 (or 308), the sensing circuit 304, and the touch controller 306. The sensing circuit 304 or the driving circuit 308 may be integrated into a readout integrated circuit (IC).

The driving circuit 302 supplies the common voltage Vcom to the Tx lines T1 to Tj during the pixel driving period P1 and supplies a driving signal to the Tx lines T1 to Tj during the touch sensor driving period P2. The driving signal swings between a touch driving voltage Vdry and a reference voltage Vref.

The sensing circuit 304 supplies the common voltage Vcom to the Rx lines R1 to Ri during the pixel driving period P1 and receives the voltage of the touch sensors during the touch sensor driving period P2. The sensing circuit 304 amplifies an analog output signal of the touch sensors received through the Rx lines R1 to Ri and converts the amplified analog output into digital data. The sensing circuit 304 then generates touch raw data.

The driving circuit 308 of FIG. 4 supplies the common voltage Vcom to the common electrode division patterns COM1 to COMn during the pixel driving period P1 and supplies the driving signal shown in FIG. 5 to the sensing lines S1 to Sn during the touch sensor driving period P2. The driving circuit 308 then senses changes in capacitances of the touch sensors and outputs the touch raw data.

The touch controller 306 analyzes the touch raw data received from the sensing circuit 304 or the driving circuit 308 using a predetermined touch recognition algorithm. In one aspect, the touch controller 306 compares the touch raw data with a predetermined threshold voltage for detecting a touch. For example, the touch controller 306 may use the touch raw data equal to or greater than the predetermined threshold voltage as touch input data and may calculate a touch input position (e.g., coordinates XY) of the touch input data. Information on the coordinates XY of the touch input position output from the touch controller 306 is transmitted to the host system.

The source driver ICs SDIC (corresponding to driver 202) do not need to operate during the touch sensor driving period P2 and thus are not used during the touch sensor driving period P2. On the other hand, the readout IC (corresponding to 304 or 308) does not need to operate during the pixel driving period P1 and thus is not used during the pixel driving period P1. The related art had the problem of an increase in power consumption resulting from unnecessary current when driving power is continuously supplied to each of the source driver IC and the readout IC during operation of the touch sensing device.

On the other hand, the touch sensing device according to the embodiment of the invention includes a driving power controller ('400' of FIG. 13 and '80' of FIG. 14) that blocks the driving power from being supplied to the readout IC during the pixel driving period P1 and blocks the driving power from being supplied to the source driver ICs SDIC during the touch sensor driving period P2. Hence, the embodiment of the invention prevents unnecessary current from flowing in the readout IC and the source driver ICs SDIC and prevents the power leak.

Figure 8:
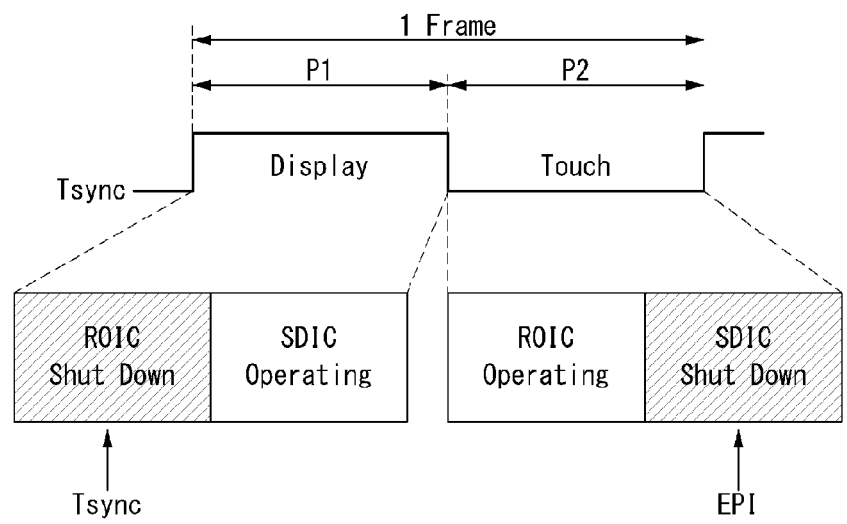
FIG. 8 illustrates a concept for reducing power consumption of a time-division driving type touch sensing device according to an exemplary embodiment of the invention.

FIG. 8 illustrates a concept for reducing power consumption of the time-division driving type touch sensing device according to the embodiment of the invention.

A display operates by dividing a frame period into two distinct periods of time: a pixel driving period P1 and a touch sensor driving period P1. A driving power controller according to the embodiment of the invention cuts off the supply voltage applied to the readout IC ROIC during the pixel driving period P1, thereby shutting down at least a portion of the readout IC ROIC during the pixel driving period P1. Further, the driving power controller cuts off the supply voltage applied to the source driver ICs SDIC during the touch sensor driving period P2, thereby shutting down at least a portion of the source driver ICs SDIC during the touch sensor driving period P2. Hence, the embodiment of the invention may prevent unnecessary current from flowing in the readout IC ROIC and the source driver ICs SDIC and may prevent the power leak.

The embodiment of the invention does not separately generate a signal for controlling the driving power and uses the time-division sync signal Tsync and the EPI interface signal, which have been already provided by the touch sensing device, thereby minimizing a cost increase resulting from the application of the invention. The driving power controller according to the embodiment of the invention may control the driving power of the readout IC ROIC based on the time-division sync signal Tsync and may control the driving power of the source driver ICs SDIC based on the EPI interface signal. The embodiment of the invention differentiates between driving power control channels of the readout IC ROIC and the source driver ICs SDIC and thus can easily secure a stable operation.

Figure 9:
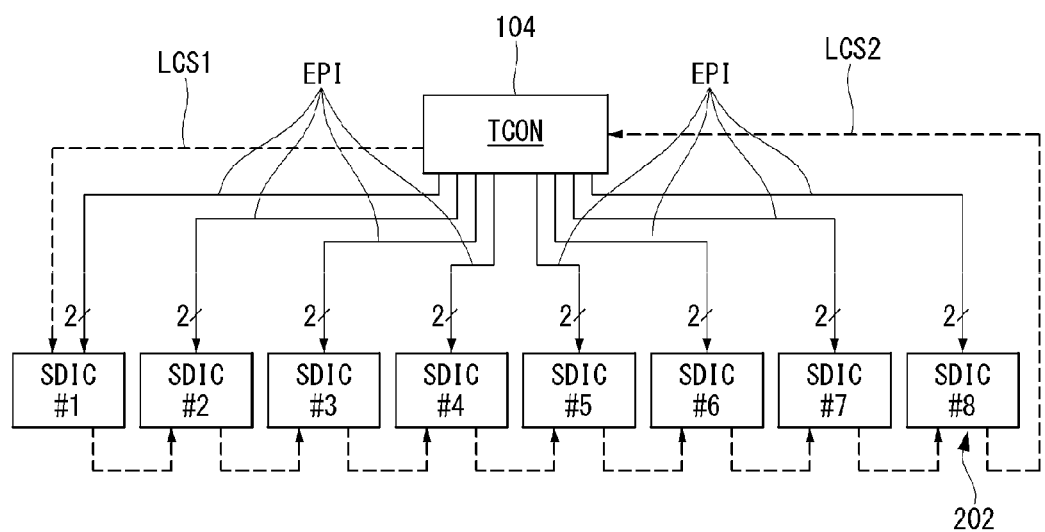
FIG. 9 shows EPI (clock embedded) lines connected between a timing controller and source driver integrated circuits (ICs)
Figure 10:
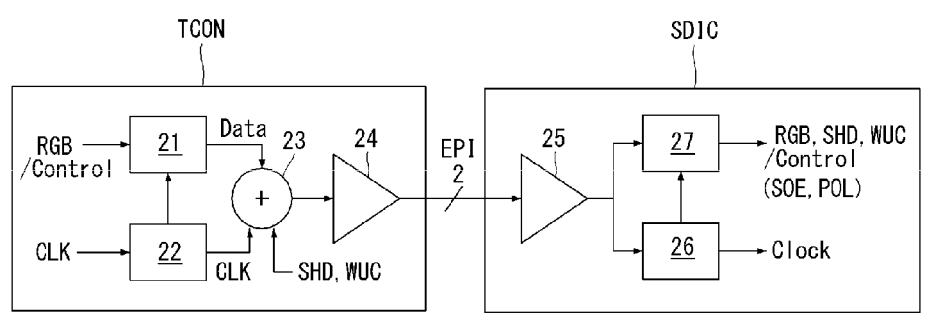
FIG. 10 shows a timing controller and a clock recovery circuit of a source driver IC.
Figure 11:
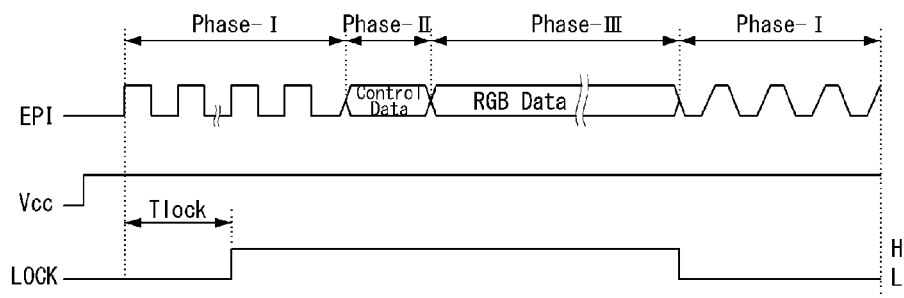
FIG. 11 is a waveform diagram showing an EPI interface protocol for signal transmission between a timing controller and source driver ICs.
Figure 12:
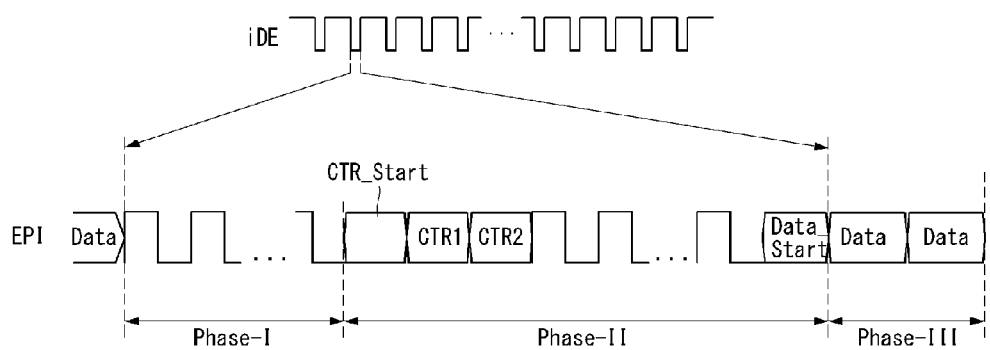
FIG. 12 is a waveform diagram showing an EPI interface signal transmitted to source driver ICs during a horizontal blank period.

FIGS. 9 to 12 show the EPI interface signal, to which a driving power control signal is encoded. More specifically, FIG. 9 shows EPI lines EPI connected between the timing controller 104 and the source driver ICs SDIC#1 to SDIC#8. FIG. 10 shows the timing controller 104 and a clock recovery circuit of the source driver IC. FIG. 11 is a waveform diagram showing an EPI interface protocol for signal transmission between the timing controller 104 and the source driver ICs SDIC#1 to SDIC#8. FIG. 12 is a waveform diagram showing the EPI interface signal transmitted to the source driver ICs SDIC#1 to SDIC#8 during a horizontal blank period.

In FIG. 9, the solid line denotes EPI line pairs EPI, over which signals including the preamble signal, the control data, the video data of the input image, etc. are transmitted. The dotted line denotes lock lines LCS1 and LCS2, to which a lock signal LOCK is transmitted.

Referring to FIGS. 9 to 12, the timing controller 104 is connected in series to each of the source driver ICs SDIC#1 to SDIC#8 through the EPI line pairs EPI.

The timing controller 104 sequentially transmits the EPI signals including the preamble signal, the control data, and the video data of the input image in the order named to the source driver ICs SDIC#1 to SDIC#8 through the EPI line pairs EPI during the pixel driving period P1. A control data packet is transmitted as a bit stream including clock bit, control start bit CTR_Start, source control data, gate control data, etc. A video data packet is transmitted as a bit stream including clock bit, internal data enable bit, RGB data bit, etc. Each of the source driver ICs SDIC#1 to SDIC#8 recovers an internal clock signal that is input through the EPI line pair EPI.

In a first stage Phase-I (see FIG. 11), the timing controller 104 transmits a lock start signal to the first source driver IC SDIC#1 through the lock line LCS1 and transmits the preamble signal for clock training to the source driver ICs SDIC#1 to SDIC#8 through the EPI line pairs EPI. The first source driver IC SDIC#1 generates a lock signal LOCK of the high logic level when a phase and a frequency of the internal clock are locked and a CRD (clock and data recovery) function is stabilized, and transmits the lock signal LOCK of the high logic level to the second source driver IC SDIC#2. Each of the source driver ICs SDIC#2 to SDIC#8 sequentially generates an internal clock through the clock training based on the lock signal LOCK of the high logic level and the preamble signal from a previous source driver IC. Each of the source driver ICs SDIC#2 to SDIC#7 transmits the lock signal LOCK of the high logic level to a next source driver IC when a phase and a frequency of the internal clock are locked and a CDR (clock and data recovery) function of the corresponding source driver IC is stabilized. When the CDR functions of all of the source driver ICs SDIC#1 to SDIC#8 are stabilized, the last source driver IC SDIC#8 transmits the lock signal LOCK of the high logic level to the timing controller 104 through the lock feedback signal line LCS2. A lock signal input terminal of the first source driver IC SDIC#1 is not connected to the output of any previous source driver IC. Instead, in one example, a DC power voltage Vcc of a high logic level is input to the lock signal input terminal of the first source driver IC SDIC#1.

After the timing controller 104 receives the lock signal LOCK of the high logic level from the last source driver IC SDIC#8, the timing controller 104 transmits the control data and the video data to each of the source driver ICs SDIC#1 to SDIC#8 in second and third stages Phase-II and Phase-III. The control data includes source control data for controlling output timing, a polarity, etc. of the data voltage output from the source driver ICs SDIC#1 to SDIC#8. The control data may include gate control data for controlling operating timing of the gate driver IC.

The timing controller 104 receives the digital video data RGB of the input image from the host system through an interface receiving circuit 21 (see FIG. 10). The timing controller 104 may generate the control data including the source control data and the gate control data based on an external timing signal input from the host system using an internal timing control signal generating circuit 22. An encoder 23 may embed clocks CLK, a shut-down control signal SHD, and a wake-up control signal WUC in a data packet in conformity with a format determined by the EPI interface protocol. An output of the encoder 23 is converted into differential signal pair through a transmitting buffer 24 and is transmitted to the source driver ICs SDIC#1 to SDIC#8.

A receiving buffer 25 of the source driver IC SDIC receives an EPI signal from the timing controller 104 through the EPI line pair EPI. A clock recovery circuit 26 of the source driver IC SDIC recovers the received clock and generates an internal clock. A sampling circuit 27 of the source driver IC SDIC samples each of bits of the control data and the digital video data of the input image in conformity with internal clock timing.

In FIG. 11, "Tlock" is a time from after the preamble signal starts to be transmitted to the source driver ICs SDIC#1 to SDIC#8, until outputs of the clock recovery circuits of the source driver ICs SDIC#1 to SDIC#8 are stably locked and the lock signal LOCK is inverted to a high logic level H.

In the EPI interface protocol, 1 data packet transmitted to the source driver ICs SDIC#1 to SDIC#8 includes a plurality of data bits and clock bits assigned before and after the data bits. The data bits are bits of the control data or bits of the digital video data of the input image and may include the shut-down control signal SHD and the wake-up control signal WUC.

In the EPI interface protocol, as shown in FIG. 12, the signal in the first stage Phase-I and the signal in the second stage Phase-II may be transmitted to the source driver ICs SDIC#1 to SDIC#8 in each horizontal blank period between pulses of the internal data enable signal iDE.

Figure 13:
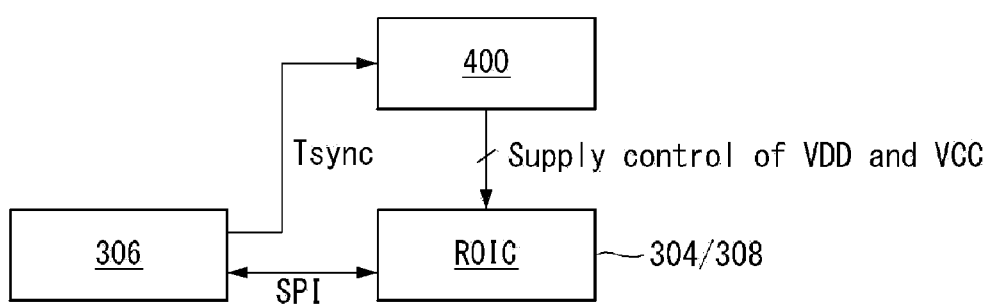
FIG. 13 shows a first driving power controller for controlling driving power of a readout integrated circuit (IC)

FIG. 13 shows a first driving power controller 400 for controlling the driving power of the readout IC ROIC.

Referring to FIG. 13, the touch controller 306 may communicate with the readout IC ROIC through a serial peripheral interface (SPI) manner and may exchange information. The touch controller 306 receives the time-division sync signal Tsync from the timing controller 104 and supplies the time-division sync signal Tsync to the first driving power controller 400. As shown in FIG. 8, the time-division sync signal Tsync may have a first logic level in the pixel driving period P1 and may have a second logic level in the touch sensor driving period P2. When the time-division sync signal Tsync of the first logic level is input (i.e., during the pixel driving period P1), the first driving power controller 400 cuts off driving supply voltages VCC and VDD applied to the readout IC ROIC. Hence, at least a portion of the readout IC ROIC is shut down during the pixel driving period P1, and unnecessary power consumption in the pixel driving period P1 decreases. When the time-division sync signal Tsync of the second logic level is input (i.e., during the touch sensor driving period P2), the first driving power controller 400 normally applies the driving supply voltages VCC and VDD to the readout IC ROIC.

In FIG. 13, "VCC" indicates the driving supply voltage applied to and powering digital circuit blocks of the readout IC ROIC for sensing the touch input, "VDD" indicates the driving supply voltage applied to and powering analog circuit blocks of the readout IC ROIC for sensing the touch input. The first driving power controller 400 may control at least one of the driving supply voltages VCC and VDD.

Figure 14:
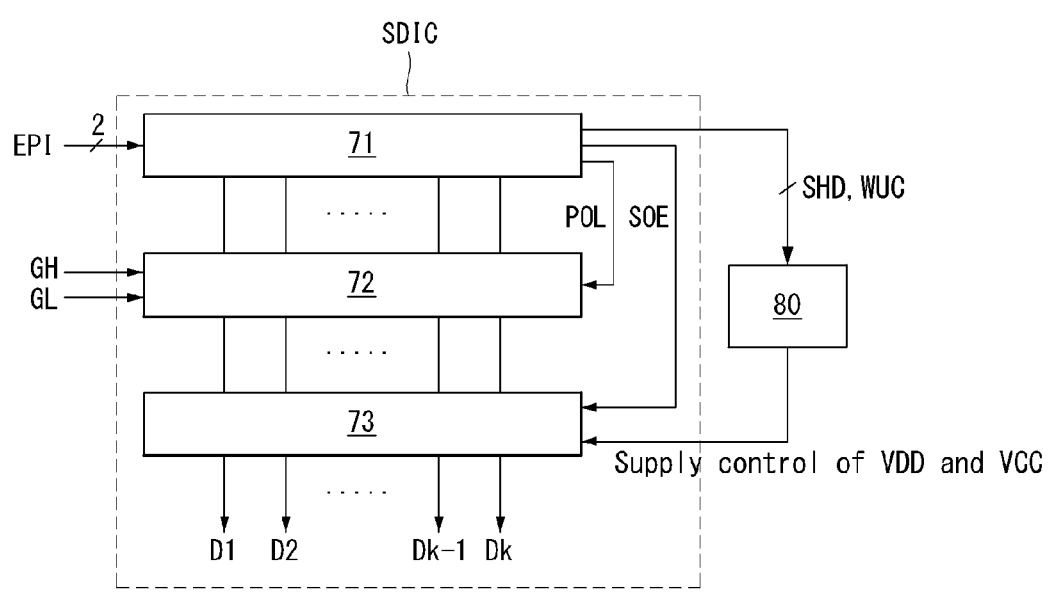
FIG. 14 shows a second driving power controller for controlling driving power of a source driver IC.
Figure 15:
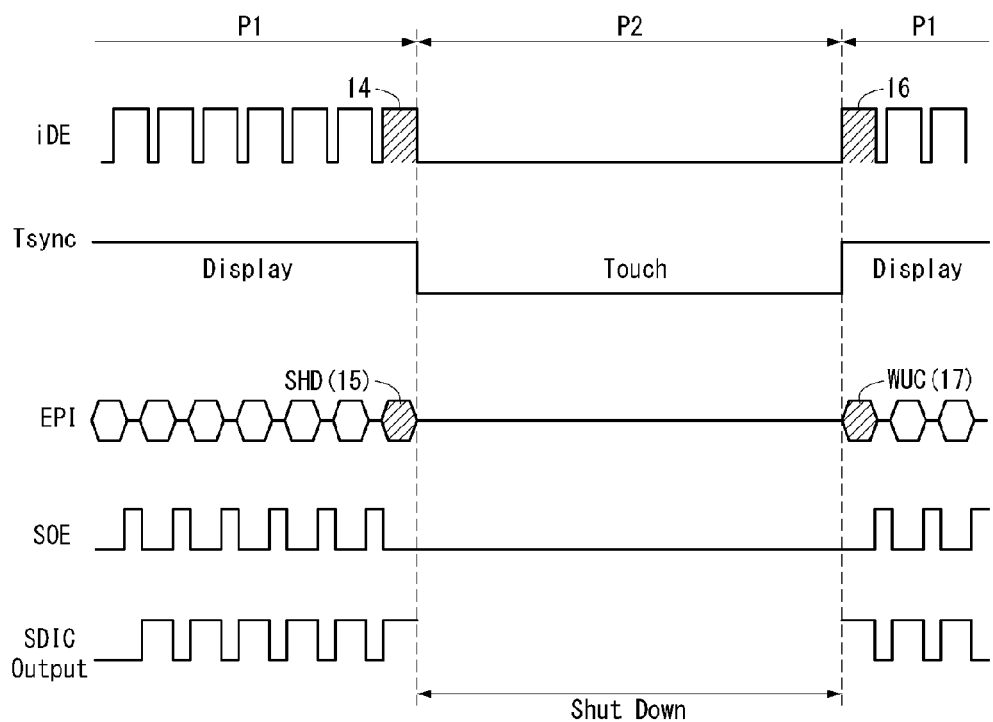
FIG. 15 shows an example where a driving power control signal is encoded to an EPI data packet.

FIG. 14 shows a second driving power controller 80 for controlling the driving power of the source driver IC SDIC. FIG. 15 shows an example where a driving power control signal is encoded to an EPI data packet.

The source driver IC SDIC supplies the positive and negative data voltages to k data lines D1 to Dk, where k is a positive integer equal to or greater than 2. As shown in FIG. 14, the source driver IC SDIC may include a data sampler and deserializer 71, a digital-to-analog converter (DAC) 72, an output circuit 73, and the like.

As shown in FIG. 10, the data sampler and deserializer 71 may include the receiving buffer 25, the clock recovery circuit 26, and the sampling circuit 27. The data sampler and deserializer 71 outputs the internal clocks using the clock recovery circuit 26 and samples the bits of the digital video data RGB of the input image received through the EPI line pair EPI in response to the internal clocks. The data sampling and deserializer 71 latches the sampled data bits and then outputs simultaneously the data bits. Hence, the data bits are converted into parallel data.

The data sampler and deserializer 71 recovers the control data received through the EPI line pair EPI in a code mapping manner and generates the source control data. When the gate control data is encoded to the control data, the data sampler and deserializer 71 recovers the gate control data from the control data received through the EPI line pair EPI and transmits the recovered gate control data to the gate driver ICs. The source control data may include the source output enable signal SOE, the polarity control signal POL, the option information, and the like. The polarity control signal POL indicates polarities of the positive and negative analog data voltages supplied to the data lines D1 to Dk. The source control data and the gate control data are encoded by the timing controller 104 and are transmitted to the source driver IC SDIC through the EPI line pair EPI in the second stage Phase-II. An encoding method and a recovery method of the control data in the EPI interface protocol are disclosed in Korean Patent Application No. 10-2008-0132466 (Dec. 23, 2008) and U.S. patent application Ser. No. 12/537,341 (Aug. 7, 2009) owned by the present applicant, and which are hereby incorporated by reference in their entirety.

The DAC 72 converts the video data received from the data sampling and deserializer 71 into a positive gamma compensation voltage GH and a negative gamma compensation voltage GL and generates the positive and negative analog data voltages. The DAC 72 inverts the polarity of the data voltage in response to the polarity control signal POL.

The output circuit 73 does not output the data voltage during a high logic period of the source output enable signal SOE and supplies an average voltage of the positive data voltage and the negative data voltage to the data lines D1 to Dk through the charge sharing. During a period of the charge sharing, output channels of the source driver ICs SDIC#1 to SDIC#8, to which the positive data voltage is supplied, and output channels of the source driver ICs SDIC#1 to SDIC#8, to which the negative data voltage is supplied, are short-circuited, and thus the average voltage of the positive data voltage and the negative data voltage is supplied to the data lines D1 to Dk. The output circuit 73 supplies the positive and negative data voltages to the data lines D1 to Dk through an output buffer during a low logic period of the source output enable signal SOE. Thus, the source driver IC SDIC outputs the data voltage during the low logic period of the source output enable signal SOE and inverts the polarity of the data voltage in response to the polarity control signal POL.

The timing controller 104 may additionally generate dummy data enable pulses 14 and 16 at the end and the beginning of the pixel driving period P1, respectively, and may transmit the driving power control signals SHD and WUC to the source driver IC SDIC through the EPI line pair EPI in synchronization with the dummy data enable pulses 14 and 16. In this instance, as shown in FIG. 15, the driving power control signals SHD and WUC are encoded inside dummy data packets 15 and 17, that are additionally generated at the end and the beginning of the pixel driving period P1, respectively, and are transmitted to the source driver IC SDIC.

The data sampling and deserializer 71 recovers the driving power control signals SHD and WUC received through the EPI line pair EPI and supplies the recovered driving power control signals SHD and WUC to the second driving power controller 80.

The second driving power controller 80 cuts off the driving power supply voltages VCC and VDD applied to the source driver IC SDIC (i.e., the output circuit 73) in response to the shut-down control signal SHD received from the data sampling and deserializer 71 during the touch sensor driving period P2. As shown in FIG. 14, the supply voltages VCC and VDD are only cut off to output circuit 73 and are not cut off to the DAC 72. Hence, at least a portion of the source driver IC SDIC is shut down during the touch sensor driving period P2, and unnecessary power consumption in the touch sensor driving period P2 decreases. The second driving power controller 80 normally applies the driving supply voltages VCC and VDD to the source driver IC SDIC in response to the wake-up control signal WUC received from the data sampling and deserializer 71 during the pixel driving period P1.

In FIG. 14, "VCC" indicates the driving supply voltage applied to and powering digital circuit blocks of the source driver IC SDIC, "VDD" indicates the driving supply voltage applied to and powering analog circuit blocks of the source driver IC SDIC. The second driving power controller 80 may control at least one of the driving supply voltages VCC and VDD.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power controller for a touch sensing display device supporting a pixel driving period and a touch driving period in each frame period, the display device comprising a data driving circuit to drive data signals onto data lines of a display panel during the pixel driving period of each frame period and being powered by a first power supply voltage and a second power supply voltage, the power controller comprising:
    a power control circuit to cut off the first power supply voltage and the second power supply voltage from powering the data driving circuit during the touch driving period of each frame period, touch data being generated from signals of touch sensing lines of the display panel during the touch driving period,
    wherein the first power supply voltage that is cut off during the touch driving period of each frame period is a power supply voltage for an analog portion of the data driving circuit, and
    wherein the second power supply voltage that is cut off during the touch driving period of each frame period is a power supply voltage for a digital portion of the data driving circuit.

2. The power controller of claim 1, wherein the power control circuit applies the first power supply voltage and the second power supply voltage to the data driving circuit responsive to a wake up signal provided by a timing controller.

3. The power controller of claim 1, wherein the data driving circuit comprises a digital-to-analog converter (DAC) to convert video data into analog data voltages and an output circuit to drive the analog data voltages onto the data lines, wherein the first power supply voltage that is cut off during the touch driving period of each frame period is cut off to the output circuit but is not cut off to the DAC.

4. The power controller of claim 1, wherein the touch driving period is distinct from the pixel driving period in each frame period.

5. A power controller for a touch sensing display device supporting a pixel driving period and a touch driving period in each frame period, the display device comprising a touch readout circuit to generate touch data from signals of touch sensing lines of the display panel during the touch driving period of each frame period, the touch readout circuit powered by a power supply voltage, the power controller comprising:
   a power control circuit to cut off the power supply voltage from powering the touch readout circuit during the pixel driving period of each frame period, data signals being driven onto data lines of the display panel during the pixel driving period.

6. The power controller of claim 5, wherein the power control circuit cuts off the power supply voltage of the touch readout circuit responsive to a timing division synchronization signal provided by a timing controller.

7. The power controller of claim 5, wherein the power supply voltage that is cut off during the pixel driving period of each frame period is a power supply voltage for an analog portion of the touch readout circuit.

8. The power controller of claim 5, wherein the power supply voltage that is cut off during the pixel driving period of each frame period is a power supply voltage for a digital portion of the touch readout circuit.

9. The power controller of claim 5, wherein the touch driving period is distinct from the pixel driving period in each frame period.

10. A method of operation in a power controller for a touch sensing display device driven in a touch driving period and a pixel driving period in each frame period, the method comprising:
   providing a first power supply voltage and a second power supply voltage to a data driving circuit during the pixel driving period of each frame period, the data driving circuit driving data voltages onto data lines of a display panel during the pixel driving period, the first power supply voltage being a power supply voltage for an analog portion of the data driving circuit, the second power supply voltage being a power supply voltage for a digital portion of the data driving circuit;
   cutting off the first power supply voltage from powering the analog portion of the data driving circuit during the touch driving period of each frame period, touch data being generated from signals of touch sensing lines of the display panel during the touch driving period; and
   cutting off the second power supply voltage from powering the digital portion of the data driving circuit during the touch driving period of each frame period.

11. The method of claim 10 wherein the first power supply voltage and the second power supply voltage are provided to the data driving circuit responsive to a wake up signal provided by a timing controller.

12. The method of claim 10, wherein the touch driving period is distinct from the pixel driving period in each frame period.

13. A method of operation in a power controller for a touch sensing display device driven in a touch driving period and a pixel driving period in each frame period, the method comprising:
   providing a power supply voltage to a touch readout circuit during the touch driving period of each frame period, the touch readout circuit generating touch data from signals of touch sensing lines of a display panel during the touch driving period of each frame period; and
   cutting off the power supply voltage from powering the touch readout circuit during the pixel driving period of each frame period, data signals being driven onto data lines of the display panel during the pixel driving period.

14. The method of claim 13, wherein the power supply voltage of the touch readout circuit is cut off responsive to a timing division synchronization signal provided by a timing controller.

15. The method of claim 13, wherein the power supply voltage that is cut off during the pixel driving period of each frame period is a power supply voltage for an analog portion of the touch readout circuit.

16. The method of claim 13, wherein the power supply voltage that is cut off during the pixel driving period of each frame period is a power supply voltage for a digital portion of the touch readout circuit.

17. The method of claim 13, wherein the touch driving period is distinct from the pixel driving period in each frame period.

* * * * *